United States Patent [19]

Hammer et al.

[11] 4,002,710
[45] Jan. 11, 1977

[54] PROCESS FOR THE PRODUCTION OF SHAPED ARTICLES OF PLASTIC MATERIAL COMPOSED OF CHEMICALLY MODIFIED PROTEIN

[75] Inventors: Klaus-Dieter Hammer, Mainz; Walter Busch; Wolfgang Klendauër, both of Wiesbaden, all of Germany

[73] Assignee: Hoechst Aktiengesellschaft, Germany

[22] Filed: Oct. 3, 1975

[21] Appl. No.: 619,223

[30] Foreign Application Priority Data

Oct. 7, 1974 Germany .......................... 2447680

[52] U.S. Cl. ............... 264/183; 106/136; 106/147; 106/153; 106/154 Z; 106/161; 260/112 R; 260/117; 260/121; 260/123; 138/118.1; 264/202

[51] Int. Cl.² .......................... C08L 89/00

[58] Field of Search .......... 106/124, 125, 135, 136, 106/138, 147–149, 154; 96/111; 8/127.6; 260/8, 112, 117, 121, 123, 561 N; 264/183, 202

[56] References Cited

UNITED STATES PATENTS

| | | | |
|---|---|---|---|
| 2,375,103 | 5/1945 | Harrison | 260/123 |
| 3,749,573 | 7/1973 | Froehlich | 96/111 |
| 3,885,054 | 5/1975 | Cohly | 264/183 |

*Primary Examiner*—Theodore Morris
*Attorney, Agent, or Firm*—James E. Bryan

[57] ABSTRACT

This invention relates to a process for the production of a shaped article of a plastic material of chemically modified protein, which comprises mixing an alkaline aqueous protein solution with an aqueous solution of an organic tetrafunctional, unsaturated compound of the general formula

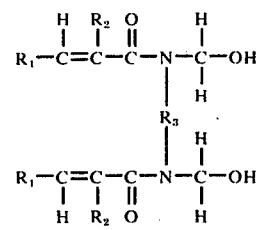

in which
$R_1$ and $R_2$ are hydrogen or an alkyl group with 1 to 6 carbon atoms, and
$R_3$ is the group $-(CH_2)_n-$, n being an integer from 1 to 8, or the group

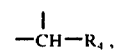

in which $R_4$ is an alkyl group with 1 to 18 carbon atoms, spinning the resulting viscous liquid ready for spinning by means of a shaping die into a precipitating liquid, washing the shaped article with a washing liquid, causing an aqueous solution of an organic, saturated, at least bifunctional compound to act on the article, heating the article, optionally causing plasticizer liquid to act on it, and drying.

31 Claims, No Drawings

PROCESS FOR THE PRODUCTION OF SHAPED ARTICLES OF PLASTIC MATERIAL COMPOSED OF CHEMICALLY MODIFIED PROTEIN

This invention relates to a process for the production of shaped articles based on plastic material of chemically modified protein.

This invention further relates to shaped articles produced according to the above process which are based on plastic material of chemically modified protein, particularly to tubes based on plastic material of chemically modified protein for use as synthetic sausage casings.

Within the scope of the present invention, shaped articles are films and tubes, as well as fibers.

Within the scope of the present invention, the term "shaped article(s) based on plastic material of chemically modified protein" includes those shaped articles which consist exclusively of the plastic material as well as those which, in addition thereto, contain other chemical compounds which also determine the properties of the shaped articles, particularly chemical plasticizers.

A long time before the invention of the synthetic polymers, such as polyamides, polyesters, polyurethane, and the like, attempts were made to produce shaped articles of plastic materials from natural polymers, e.g. cellulose, protein, or the like. Some of them, such as cellulose hydrate films, have been successful in competition with films of synthetic polymers and are still produced today in large quantities. Shaped articles of plastic materials based on protein, however, are not important due to their moderate material properties. A large part of the shaped articles based on natural material are artificial sausage casings based on collagen. By dissolving collagen in an alkaline liquid, spinning the solution into acid precipitating liquids, and subsequent hardening, tubes are produced the properties of which are not at all satisfactory, however. Even today, shaped articles are produced from casein according to a cumbersome and expensive process; for this purpose casein is mixed with a little water and plasticized under pressure at elevated temperatures. Then, the shaped article produced from the plasticized material is treated in a formaldehyde bath and thereby hardened. Approximately one week is necessary for this treatment per 1 mm of wall thickness of the shaped article.

Fibers based on casein have not been successful in the market. Such fibers are produced by dissolving casein in NaOH or KOH, spinning the solution into acid precipitating liquids, and then cross-linking the substance forming the shaped article by means of formaldehyde. With respect to their mechanical properties, those fibers, however, could not achieve the properties of wool, which they were intended to replace.

The foregoing shows that, for the production of films and tubes, only those natural polymers can be successfully used which have good film-forming properties themselves, such as cellulose hydrate and collagen.

According to the hitherto known tests, natural products, such as casein, gelatin, amylose, alginates, or the like materials, always have led to brittle shaped articles which have too low a strength and too low an elongation.

The problem of the present invention is to provide a process for the production of shaped articles, based on plastic material of chemically modified protein, which have good strength and elongation properties. On the basis of the prior art and deviating therefrom, there must be found a possibility for producing shaped articles from chemically modified protein according to which the chemically modified protein has good film-forming properties.

The problem of the invention is solved by a process for the production of a shaped article based on plastic material of chemically modified protein, in which process an alkaline aqueous protein solution is mixed with an aqueous solution of an organic tetrafunctional, unsaturated compound of the general formula

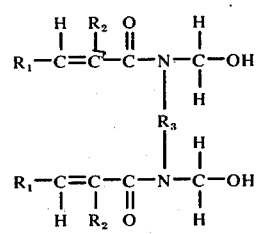

in which $R_1$ and $R_2$ are hydrogen or an alkyl group with 1 to 6, preferably 1 to 3, carbon atoms, and $R_3$ is the group $-(CH_2)_n-$, $n$ being an integer from 1 to 8, or the group

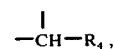

in which $R_4$ is an alkyl group with 1 to 18 carbon atoms, the viscous liquid ready for spinning is spun by means of a shaping die into a precipitating liquid, the shaped article is treated with washing liquid, an aqueous solution of an organic, saturated, at least bifunctional compound is caused to act on the article, the article is heated, optionally plasticizer liquid is caused to act thereon, and it is then dried.

The saturated, alkaline protein solution contains gelatin, collagen, zein, peanut protein, particularly preferably, however, casein, as the dissolved protein.

The aqueous, alkaline protein solution contains protein in quantities in the range of 5 to 15 percent by weight, preferably in the range of 7 to 12 percent by weight, calculated on the total weight of the protein solution.

Aqueous protein solutions having a pH value in the range of 8 to 14 preferably between 10 to 12, are preferred. Particularly preferable are aqueous ammoniacal protein solutions having the abovementioned pH value.

In the performance of the process of the invention, the protein solution is mixed with an aqueous solution of an organic, tetrafunctional compound with two reactive carbon double bonds as well as two reactive N-methylol groups of the general formula

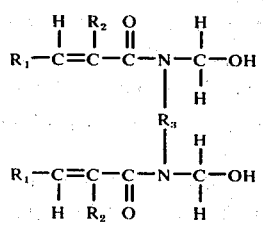

in which
R₁ and R₂ are hydrogen or an alkyl group with 1 to 6, preferably 1 to 3, carbon atoms, and
R₃ is the group -(CH₂)$_n$-, n being an integer from 1 to 8, or the group

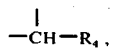

in which R₄ is an alkyl group with 1 to 18 carbon atoms. The above organic, doubly unsaturated, tetrafunctional compound is called a first cross-linking agent in the following description. Preferable first cross-linking agents are those which correspond to the above general formula under the condition that R₁ is hydrogen, R₂ is a methyl group, and R₃ is the group —(CH₂)-; preferable first cross-linking agents thus are N-methylol-N,N'-methylene-bisacrylamide as well as N-methylol-N,N'-methylene-bismethacrylamide.

The aqueous solution containing a first cross-linking agent has a content of dissolved substance in the range between 0.5 and 30 percent by weight, preferably between 1 and 15 percent by weight, calculated on the total weight of the solution. The solution also may contain a mixture of the first cross-linking agents.

Protein solution and solution containing a first cross-linking agent have a temperature in the range between 10° and 90° C, advantageously in the range between 15° and 30° C, before both solutions are mixed.

The liquid mixture obtained by mixing the protein solution with the solution of the first cross-linking agent has a portion of first cross-linking agent in the range between 0.2 and 20 percent by weight, preferably between 0.5 and 10 percent by weight, calculated on the weight of the protein quantity contained in the liquid mixture. The protein quantity contained in the liquid mixture is in the range of 5 to 20 percent by weight, preferably 8 to 15 percent by weight, calculated on the total weight of the liquid mixture.

In the second stage of the process, the protein addition compound obtained in the first process stage is chemically reacted by means of an organic, preferably aliphatic, saturated, at least bifunctional compound; during the performance of the process, this compound is used in the form of an aqueous solution. The organic, saturated, preferably aliphatic compound has at least two reactive OH or at least two reactive NH₂ groups or at least one reactive OH and at least one reactive NH₂ group in the molecule. The compound is called a second cross-linking agent in the following description. Particularly suitable as the second compound are aliphatic diols, such as glycol, propanediol, as well as butanediol, polyols, such as glycerol or pentaerithritol, and polyglycols, such as polyethylene glycol of the general formula

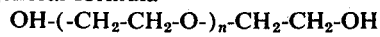

in which
n is an integer from 1 to 20, preferably in the range from 1 to 5, particularly preferably in the range from 1 to 3 (diglycol, triglycol, polyethylene glycol 200),
or propylene glycol of the general formula
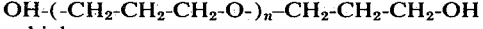
in which
n is an integer from 1 to 10, advantageously in the range from 1 to 5,
aliphatic diamines the carbon chain of which has 1 to 6 carbon atoms, such as ethylene diamine, as well as hexamethylene diamine, aliphatic polyamines, aliphatic hydroxylamines, such as 1-hydroxy-6-aminohexane, urea, and melamine.

The second cross-linking agents also may be in admixture in the aqueous solution. The solution contains 2 to 40 percent by weight, preferably 8 to 20 percent by weight, of dissolved substance. If the second cross-linking agents, due to their molecular structure, have a plasticizing effect, internally plasticized plastics are obtained when they are used. In contradistinction to internally plasticized plastics in which the plasticizing component is firmly incorporated in the plastic material, in the case of externally plasticized plastics, the chemical plasticizer is bonded in the plastic material by intermolecular forces only and thus is extractable.

The above-listed cross-linking agents have a plasticizing effect, with the exception of urea and melamine.

The polyols preferred as internal plasticizers also may be additionally used as external plasticizers in the internally plasticized plastic material of chemically modified protein.

The aqueous solution of the second chemical cross-linking agent has a pH value below 7, particularly in the range of 2 to 6; in a preferred embodiment of the process, this aqueous solution contains a known cross-linking catalyst, such as NH₄Cl or MgCl₂ or similarly acting compounds in quantities between 2 and 20 g/l of the solution.

The organic, saturated, at least bifunctional compound is contained in the corresponding solution in a quantity of 0.2 to 20 percent by weight, preferably of 0.5 to 15 percent by weight.

When, as the second cross-linking compound, a compound is used which is not capable of imparting an internal plasticizing effect to the formed plastic material, such as urea or melamine, it is advantageous to incorporate, in the shaped article of plastic material of chemically modified protein, suitable plasticizers which effect secondary plasticizing of the shaped article. Plasticizers suitable therefor are the known plasticizers for plastic materials, e.g. dibutyl adipate, the polyester of adipic acid and butylene glycol, di-n-hexylphthalate, toluene sulfomethylamide, polyvinyl ether, dioctyl sebacate, dibenzyl sebacate, the diethyl ester of phthalic acid, di-n-butylphthalate, glycerol triacetate, hexane trioltriacetate, glycerol tripropionate, and dicyclohexylphthalate. For this purpose, aqueous solutions of the plasticizers are used when these solutions contain 20 to 200 g, preferably 80 to 150 g, of plasticizer per liter of solution. Glycerol, glycol, and triglycol also can be used as external plasticizers.

This plasticizer-containing solution is caused to act upon the shaped article based on plastic material of chemically modified protein, the duration of action being so selected that, after the action, the shaped article has a content in the range from 5 to 50 percent by weight, particularly preferably from 8 to 30 percent by weight, of secondary plasticizer. The procedure is analogous when it appears advantageous in a particular case to additionally plasticize shaped articles of internally plasticized plastic material of chemically modified protein.

The precipitating liquid is known under the name "Muller bath". It is composed, for example, of an aqueous solution which contains 0.5 to 20 percent by weight, preferably 1 to 12 percent by weight, of sulfuric acid, and 1 to 30 percent by weight, preferably 2 to 15 percent by weight, of $Na_2SO_4$, e.g. 10 percent by weight of sulfuric acid and 14 percent by weight of sodium sulfate, calculated on the total weight of the solution.

The precipitating liquid has a temperature in the range between 20° and 100° C, advantageously between 20° and 60° C.

The product obtained by mixing the protein solution with the solution of the first cross-linking compound by the addition of protein molecules and first cross-linking agent is called protein addition compound in the following; it is an intermediate product in the course of the procedure for the production of the shaped article based on plastic material of chemically modified protein.

The first cross-linking agent contains reactive groups of different structures which are reactive under different reaction conditions. The carbon double bonds of the first cross-linking agent are reactive in an alkaline medium at low temperatures, e.g. at room temperature, whereas the N-methylol groups of the molecule are not reactive under those conditions but are reactive in a weakly alkaline to acid medium at elevated temperatures, e.g. at 130° to 150° C. The addition of protein and first cross-linking agent proceeds spontaneously within a short time under the above conditions with the formation of the intermediate product. Chemical reaction between the protein addition compound and the second cross-linking compound, which leads to the plastic material of chemically modified protein, proceeds more slowly. For this reason, it is advantageous to accelerate this reaction by reaction catalysts.

The performance of the process of the invention is described in the following:

Protein, preferably casein, for example, is swollen in water with stirring and dissolving by the addition of $NH_4OH$ or $NaOH$ to form a colloidal solution with a dissolved portion in the range of 5 to 15 percent by weight, preferably of 7 to 12 percent by weight, calculated on the total weight of the solution, e.g. by the addition of the quantity of concentrated aqueous $NH_4OH$ (25 percent by weight) necessary for adjusting the pH value.

By dissolving a first cross-linking agent, e.g. N-methylol-N,N'-methylene-bisacrylamide, in water, an aqueous solution of the stated concentration is prepared.

The first-mentioned, as well as the second, solution is used at a temperature in the range of 5° to 25° C, preferably at room temperature.

The two solutions are then mixed with intense stirring; the solution containing N-methylol-N,N'-methylene-bisacrylamide is stirred into the colloidal protein solution.

The liquid obtained by mixing the two solutions is called the liquid reaction mixture.

The liquid reaction mixture is subjected to a dwell time in the range of 2 to 12, preferably 4 to 8, hours. The liquid reaction mixture then has a viscosity in the range of 80 to 250 falling-ball seconds which is called spinning viscosity.

The falling-ball viscosity is measured as follows:

A glass tube of a length of about 450 mm and an inside diameter of 25 mm has two marks at a distance of 150 mm from one another. One end of the tube is closed by means of a stopper. The solution to be measured is poured into the obliquely held tube until it is above the upper mark. The tube is then stored at 25° C until no air bubbles can be recognized in the filled-in solution. For measurement, a ball of a diameter of 2.5 mm and a weight of 64.5±0.9 mg is caused to fall into the upper opening of the vertical tube.

The falling time of the ball between the two marks is measured. The measure of the viscosity of the solution is the number of seconds which corresponds to the falling time of the ball between the two marks on the tube.

The liquid reaction mixture ready for spinning, due to its viscosity, is then spun by means of a shaping die into a spinning solution. The gap of the die may be straight but it also may be circular or have the form of a circular ring.

When the liquid reaction mixture enters the precipitating liquid, the protein addition compound is precipitated, depending upon the die used, as an article in the form of a web or a film or a fiber, preferably in the form of a tube. The shaped article still has a relatively low strength in this state.

In a succeeding process step, the article formed by precipitation is subjected to the action of a second precipitating liquid which differs from the first one only in the concentration of the dissolved substance, the concentration being below that of the first solution and amounting to about 1 to 8 percent by weight of $H_2SO_4$, and 6 to 15 percent by weight of $Na_2SO_4$, preferably 1 to 3 percent by weight of $H_2SO_4$, and 10 to 12 percent by weight of $Na_2SO_4$.

The shaped article is then washed, e.g. it is contacted with water. Subsequently, for example a 12 percent by weight aqueous solution of the second cross-linking agent, e.g. glycerol, is caused to act upon the shaped article, which solution additionally contains, for example, 0.2 percent by weight of a cross-linking catalyst, e.g. $NH_4Cl$. The concentration of the second cross-linking compound in the solution and the duration of the action thereof upon the shaped article are so selected that the latter, after the action, has a content in the range of 2 to 40 percent by weight, calculated on the total weight of the shaped article, of the stated compound.

Then, heat at a temperature sufficient to effect chemical reaction between the protein addition compound and the second cross-linking compound is caused to act upon the shaped article. This may be performed, for example, by continuously passing the shaped article through a heating channel with air at a temperature in the range of 80° to 180° C, preferably 110° to 150° C.

The dwell time of the shaped article in the drying channel, depending upon the speed of travel of the same through the channel, is sufficient to effect the desired cross-linkage between the protein addition product and the reactive groups of the second cross-linking agent.

By the action of heat effecting cross-linkage, the shaped article is simultaneously freed from excessive liquid. The resulting product is called plastic material of chemically modified protein.

In the above process description, a second chemical cross-linking agent is selected, for example, which, due to its chemical constitution, has a plasticizing effect so that the end product is internally plasticized.

If the softness of the plastic material effected by internal plasticizing is not sufficient for certain cases of application or if there is no internal plasticizing, additional plasticizer is caused to act upon the shaped article based on plastic material of chemically modified protein for externally plasticizing the plastic material. Suitable for this purpose are the chemical media capable of internal plasticizing or also the above-mentioned known plasticizers; in both cases the portion of additional plasticizer exceeding the portion of the internal plasticizer is bonded to the plastic material by intermolecular forces.

In both cases, the procedure is such that the shaped article based on plastic material of chemically modified protein is subjected to the action of an aqueous plasticizer-containing solution, e.g. to an aqueous solution of triglycol. The plasticizer solution used contains 20 to 150 g, preferably 80 to 120 g, of plasticizer per liter of solution. The conditions of the action of the plasticizer solution upon the shaped article are so selected that the shaped article, after the action, contains a sufficient portion of incorporated medium acting as the secondary plasticizer, advantageously a quantity in the range of 2 to 40 percent by weight, calculated on the total weight of the shaped article.

The shaped articles produced according to the process of the invention, which are based on a plastic material of chemically modified protein, have good strength and elongation values. The tensile strength is in the range of 1.5 to 5 kg/mm, and the elongation is in the range of 5 to 120 percent. The shaped articles have a swelling value (content of water in percent by weight of the shaped article after storage of the same in water and subsequent centrifuging) of 50 to 120 percent and can be biologically degraded.

As long as the structure of the plastic material of chemically modified protein is not clarified it is assumed, by way of a working hypothesis, that the shaped article produced according to the process of the invention is substantially composed of plastic material of chemically modified protein the chemical structure of which corresponds approximately to the general formula

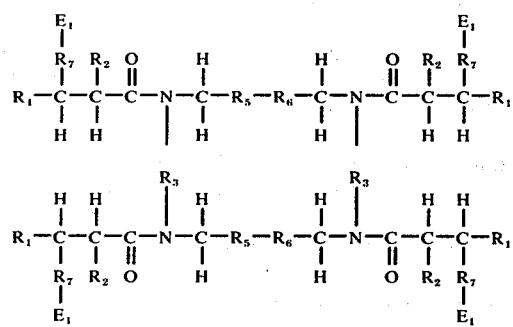

in which $R_1$ is a hydrogen atom or an alkyl group with 1 to 6, preferably 1 to 3, carbon atoms, $R_2$ is a hydrogen atom or an alkyl group with 1 to 6, preferably 1 to 3, carbon atoms, $R_3$ is the group $-(CH_2)_n-$

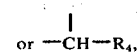

$n$ being an integer from 1 to 8, $R_4$ is an alkyl group with 1 to 18 carbon atoms, $R_5$ is the group -NH- or -O—, $R_6$ is the group $-(CH_2)_{n_1}$, $n_1$ being an integer from 2 to 6, or the group $-(CH_2-CH_2-O-)_{n_2}-CH_2-CH_2-$, in which $n_2$ is an integer from 1 to 20, preferably from 1 to 10, or the group $-(CH_2-CH_2-CH_2-O-)_{n_3}-CH_2-CH_2-CH_2-$, in which $n_3$ is an integer from 1 to 10, preferably from 1 to 5, or the group -CO- or the molecule group

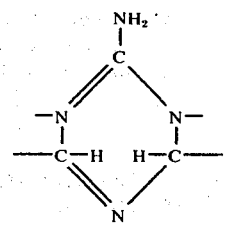

$R_7$ is the group —NH-, —S- or —O—, and $E_1$ is a protein molecule radical, preferably a casein molecule radical.

The invention will be further illustrated by reference to the following specific examples:

EXAMPLE 1

80 g of casein, corresponding to 70.3 g of pure milk protein, (Rovita FN 4; Rovita GmbH, Aschau/Kraiburg, Germany) are uniformly distributed with stirring in 556 ml of water and swollen thereby, and 34 ml of concentrated $NH_4OH$ (25 percent) are then added. The resulting casein solution has a pH value of 10.

The solution is cooled, with stirring, to room temperature. By dissolving a corresponding quantity of N-methylol-N,N'-methylenebisacrylamide in water, a solution is prepared which contains 4.3 percent by weight of dissolved substance (6 percent by weight, calculated on the quantity of milk protein). 84 ml of this solution also at room temperature are rapidly and uniformly stirred into the casein solution. After uniform distribution of the components in the solution, the viscosity spontaneously increases very considerably within a short time, which results in a gelatinous mass. The mass is left standing for 6 hours at room temperature and then has a viscosity of 200 falling-ball seconds, which is suitable for spinning.

The thoroughly degassed viscous mass is spun through a slot die into a precipitating liquid at a temperature of 40° C, which liquid is composed of water in which 100 g of sulfuric acid and 120 g of sodium sulfate are dissolved per liter. The spun film is continuously passed through this bath at a speed which corresponds to a dwell time of the film in the bath of 2 minutes.

The film is then continuously passed into a second precipitating liquid which has a temperature of 20° C and is composed of water in which 30 g/l of sulfuric acid and 100 g/l of sodium sulfate are dissolved. The dwell time of the film in the bath is 4 to 5 minutes.

The film is then washed with water and continuously passed through an aqueous glycerol solution containing 100 g of glycerol per liter at such a speed that the film then has a content of 25 percent by weight of glycerol, calculated on its total weight. The film is then heated for 15 minutes at a temperature of 140° C, dried, and thereby cross-linked. The film based on plastic material of chemically modified protein is very flexible, has a thickness of 40 μm, a tensile strength of 1.6 kg/mm², and a tensile elongation of 60 percent. The film is completely degraded by chymotrypsin within 4 hours.

EXAMPLE 2

The reaction, spinning, precipitating, washing, and drying conditions are the same as in Example 1. As a variation of Example 1, a solution is used which contains glycol instead of glycerol as the second cross-linking compound. The aqueous glycol solution contains 10 g of glycol per liter and 6 g of $MgCl_2$ per liter of the solution.

After treatment of the film with the solution containing the second cross-linking agent, heating is effected for 15 minutes at 150° C. The film is then subjected to the action of an aqueous glycerol solution which contains 120 g of glycerol per liter. After this treatment, the film containing 20 percent by weight of glycerol is dried for 20 minutes at 120° C.

The 45 μm thick film has a tensile strength of 2.8 kg/mm² and a tensile elongation of 38 percent It can be completely degraded with chymotrypsin.

EXAMPLE 3

400 g of casein, corresponding to 351.2 g of pure milk protein, (Rovita FN 4; Rovita GmbH, Aschau/Kraiburg, Germany) are uniformly distributed in 3,070 ml of water, well swollen and dissolved by the addition of 170 ml of concentrated $NH_4OH$ (25 percent). The solution contains 9.6 percent of milk protein. Within approximately 6 hours, 166.5 ml of a 5 percent aqueous solution of N-methylol-N,N'-methylene-bisacrylamide (5.7 percent, calculated on milk protein) are uniformly added to this solution at 20° C with intensive stirring.

The reaction mixture is then very viscous but becomes readily spinnable after 3 to 4 hours with a viscosity of approximately 220 falling-ball seconds.

The thoroughly degassed viscous mass is spun through a slot die into a precipitating liquid at a temperature of 40° C which liquid is composed of water in which 100 g of sulfuric acid and 120 g of sodium sulfate are dissolved per liter. The spun film is continuously passed through this bath at a speed which corresponds to a dwell time of the film in the bath of 2 minutes.

The film is then continuously passed into a second precipitating liquid which has a temperature of 20° C and is composed of water in which 30 g/l of sulfuric acid and 100 g/l of sodium sulfate are dissolved. The dwell time of the film in the bath is 4 to 5 minutes.

The film is then washed with water and continuously passed through an aqueous glycerol solution containing 100 g of glycerol per liter at such a speed that the film then has a content of 25 percent by weight of glycerol calculated on its total weight. The film is then heated for 40 minutes at a temperature of 140° C, dried, and thereby cross-linked.

The film is very flexible, transparent, and biologically degradable. The tensile strength is 2.2 kg/mm², and the elongation 64 percent.

EXAMPLE 4

80 g of casein, corresponding to 70.3 g of pure milk protein, (Rovita FN 4; Rovita GmbH, Aschau/Kraiburg, Germany) are uniformly distributed in 589 ml of water, swollen and dissolved with 34 ml of concentrated $NH_4OH$ (25 percent. With intensive stirring, 29 ml of a 5 percent (2.8 percent, calculated on milk protein) aqueous solution of N-methylol-N,N'-methylene-bisacrylamide are slowly added dropwise at 20° C during approximately 4 hours. The mixture is left standing for 3 hours at room temperature and then mixed with 29.3 g (4 percent by weight, calculated on the weight of the solution) of $NH_4Cl$ and heated for 5 hours with stirring on a water bath at 60° C. The viscosity thereby again increases considerably. After completion of the reaction and cooling down to room temperature, the mixture is diluted with water until a spinning viscosity of 200 to 250 falling-ball seconds is achieved. The solution is then thoroughly degassed.

Spinning, precipitating, washing, plasticizing and cross-linking are then performed as described in Example 1.

A 32 μm thick, flexible, transparent and biologically degradable film is obtained which has a tensile strength of 3.2 kg/mm², and an elongation of 22 percent.

EXAMPLE 5

The procedure is the same as in Example 1, with the exception that the casein solution is mixed, with stirring, with 84 ml of a 5 percent by weight (6 percent by weight, calculated on milk protein) aqueous N-methylol-N,N'-methylene-bismethacrylamide solution. Further processing is the same as in Example 1. The film has a tensile strength of 2.1 kg/mm², and an elongation of 42 percent It will be obvious to those skilled in the art that many modifications may be made within the scope of the present invention without departing from the spirit thereof, and the invention includes all such modifications.

What is claimed is:

1. A process for the production of a shaped article of a plastic material of chemically modified protein, which comprises mixing an alkaline aqueous protein solution with an aqueous solution of an organic tetrafunctional, unsaturated compound of the general formula

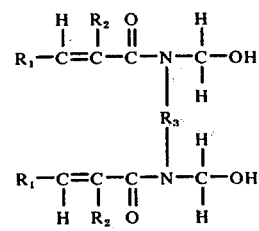

in which $R_1$ and $R_2$ are hydrogen or an alkyl group with 1 to 6 carbon atoms, and $R_3$ is the group $-(CH_2)_n-$, n being an integer from 1 to 8, or the group

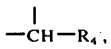

in which R₄ is an alkyl group with 1 to 18 carbon atoms, spinning the resulting viscous liquid ready for spinning by means of a shaping die into a precipitating liquid, washing the shaped article with a washing liquid, causing an aqueous solution of an organic, saturated, at least bifunctional compound to act on the article, heating the article, optionally causing plasticizer liquid to act on it, and drying.

2. A process according to claim 1 which comprises mixing an alkaline aqueous protein solution with an aqueous solution of N-methylol-N,N'-methylene-bisacrylamide or N-methylol-N,N'-methylene-bismethacrylamide, spinning the viscous liquid by means of a shaping die into a precipitating liquid, washing the shaped article with a washing liquid, causing the aqueous solution of an organic, saturated, at least bifunctional compound to act on the article, and heating the article.

3. A process according to claim 1 in which an aqueous, alkaline casein solution is used.

4. A process according to claim 1 in which the aqueous, alkaline protein solution contains a portion in the range of 5 to 15 percent by weight of protein, calculated on the total weight of the protein solution.

5. A process according to claim 4 in which the aqueous, alkaline protein solution contains a portion in the range of 7 to 12 percent by weight of protein, calculated on the total weight of the protein solution.

6. A process according to claim 1 in which the solution contains 10 to 14 percent by weight of casein.

7. A process according to claim 1 in which the solution has a pH value in the range between 8 and 14.

8. A process according to claim 7 in which the solution has a pH value between 10 and 12.

9. A process according to claim 1 in which the two solutions are mixed at a temperature between 10° and 90° C.

10. A process according to claim 9 in which the two solutions are mixed at room temperature.

11. A process according to claim 1 in which the liquid mixture has a portion in the range from 0.2 to 20 percent by weight of N-methylol-N,N'-methylene-bisacrylamide or of N-methylol-N,N'-methylene-bismethacrylamide, calculated on the casein weight.

12. A process according to claim 11 in which the liquid mixture of the aqueous casein solution and the aqeuous solution of N-methylol-N,N'-methylene-bisacrylamide or N-methylol-N,N'-methylene-bismethacrylamide contains 3 percent by weight of the latter, calculated on the casein weight.

13. A process according to claim 1 in which the liquid spun from the shaping die has a viscosity between 80 and 200 falling-ball seconds.

14. A process according to claim 1 in which the precipitating liquid is an aqueous solution containing 10 percent by weight of H₂SO₄ and 15 percent by weight of Na₂SO₄, calculated on the total weight of the liquid, and having a temperature in the range of 20° and 60° C.

15. A process according to claim 1 in which the organic, saturated, at least bifunctional compound has at least two OH or at least two NH₂ groups or at least one OH and at least one NH₂ group.

16. A process according to claim 1 in which the organic, saturated, at least bifunctional compound has at least two chemically reactive OH groups.

17. A process according to claim 1 in which the organic, saturated, at least bifunctional compound has at least two reactive NH₂ groups.

18. A process according to claim 1 in which the organic, saturated, at least bifunctional compound has at least one reactive OH and at least one reactive NH₂ group.

19. A process according to claim 1 in which the organic, saturated, at least bifunctional compound is an aliphatic compound.

20. A process according to claim 19 in which the saturated, aliphatic, at least bifunctional compound has 2 to 6 carbon atoms in the chain.

21. A process according to claim 19 in which the aliphatic, saturated, at least bifunctional compound is glycerol, glycol, polyethylene glycol, polypropylene glycol or triglycol.

22. A process according to claim 19 in which the aliphatic, saturated, at least bifunctional compound is hexamethylene diamine.

23. A process according to claim 19 in which the aqueous solution contains the aliphatic, saturated, at least bifunctional compound in a quantity in the range of 0.2 to 20 percent by weight.

24. A process according to claim 23 in which the aqueous solution contains the aliphatic, saturated, at least bifunctional compound in a quantity in the range of 0.5 to 15 percent by weight.

25. A process according to claim 14 in which the aqueous solution has a pH value below 6.

26. A process according to claim 25 in which the aqueous solution has a pH value of 2 to 4.

27. A process according to claim 1 in which, after the action of the aqueous solution containing the chemical, aliphatic, saturated, at least bifunctional cross-linking agent upon the shaped article, the shaped article is heated, which heat effects cross-linkage of the chemical compounds contained in said article.

28. A process according to claim 27 in which the heat effecting cross-linkage has a temperature in the range of 130° to 150° C.

29. A process according to claim 28 in which the heat acts during a period from 2 to 60 minutes.

30. A process according to claim 1 in which the aqueous solution containing the chemical, saturated, at least bifunctional compound with at least two active groups contains a cross-linking catalyst.

31. A tube produced according to claim 1 for use as a synthetic sausage casing.

* * * * *